United States Patent [19]

Kasai

[11] Patent Number: 4,724,584
[45] Date of Patent: Feb. 16, 1988

[54] CORD FASTENER

[75] Inventor: Kazumi Kasai, Namerikawa, Japan

[73] Assignee: Yoshida Kogyo K.K., Tokyo, Japan

[21] Appl. No.: 946,701

[22] Filed: Dec. 23, 1986

[30] Foreign Application Priority Data

Dec. 28, 1985 [JP] Japan .............................. 60-204697[U]

[51] Int. Cl.⁴ .............................................. F16G 11/04
[52] U.S. Cl. .................................. 24/115 G; 24/136 R
[58] Field of Search ................. 24/115 G, 616, 136 R, 24/266, 543

[56] References Cited

U.S. PATENT DOCUMENTS

| | | | |
|---|---|---|---|
| 2,379,676 | 7/1945 | Blackstone | 24/115 G |
| 2,524,649 | 10/1950 | Buhler | 24/115 G |
| 4,118,838 | 10/1978 | Schiefer et al. | 24/115 G |
| 4,188,686 | 2/1980 | Baum | 24/115 G |
| 4,328,605 | 5/1982 | Hutchison et al. | 24/136 R |
| 4,453,292 | 6/1984 | Bakker | 24/115 G |
| 4,622,723 | 11/1986 | Krauss | 24/115 G |

FOREIGN PATENT DOCUMENTS 2545447  9/1984  France .
54-11210  5/1979  Japan .

Primary Examiner—Victor N. Sakran
Attorney, Agent, or Firm—Hill, Van Santen, Steadman & Simpson

[57] ABSTRACT

A cord fastener composed of a male member and a female member coupled together against displacement each other since laterally outwardly projecting feet of a pair of resilient legs of the male member is normally held in interlocking engagement with a pair of locking teeth on an inner surface of a hollow tubular body of the female member. For attachment of the cord fastener to a cord, the male member is displaced against the resiliency of the legs until a through-hole in a head of the male member is brought into coaxial alignment with a pair of cord insertion holes in the tubular body, thereby permitting insertion of the cord into such aligned holes. When the male member is released from the downward pressure, the male member is urged upwardly by the resilient forces stored in the legs, whereby the cord is firmly gripped by and between the male and female members against displacement.

10 Claims, 12 Drawing Figures

CORD FASTENER

BACKGROUND OF THE INVENTION

1. Field of the Invention

The present invention relates to a cord fastener for adjustably fastening or stopping a fastening cord or string attached to a helmet, a hat, a sack, a garment, or other various articles, and more particularly to such a cord fastener constructed to utilize a spring force in locking a cord in position against displacement.

2. Description of the Prior Art

Various cord or string fasteners are known in the art which are attached to cords or strings on helmets, hats, bags, garments, or other objects for adjustably fastening or stopping the cords. One prior cord fastener is shown in Japanese Utility Model Publication No. 54-11210 published on May 22, 1979. The disclosed cord fastener is composed of an outer tube having an axial blind hole opening upwardly and a diametrical hole defined near its upper end, and an insert movably fitted in the blind hole in the outer tube and having a transverse through-hole. The ends of a cord which are inserted through the diametrical hole and the transverse through-hole are gripped between the outer tube and the insert which is resiliently urged upwardly by a compression coil spring disposed on the bottom of the blind hole in the outer tube.

Such prior cord fastener is disadvantageous in that it is costly to manufacture and tedious and time-consuming to assemble because there are three separate component parts to be assembled. Another problem is that when the cord ends are removed, the outer tube, the insert, and the spring are disassembled and tend to get lost.

SUMMARY OF THE INVENTION

With the foregoing difficulties of the prior art in view, the present invention is aimed at the provision of an improved cord fastener which is composed of only two structural components that are easily assembled together and then are retained firmly together against displacement from each other, and which can be manufactured at less cost.

The foregoing and other objects of the present invention are attained by a cord fastener comprising: a male member composed of a head having a transverse through-hole for receiving therein a cord, and at least two resilient legs extending integrally and downwardly from the head and having feet projecting laterally outwardly from lower ends of the respective legs; and a female member composed of a hollow body having an axial hole for receiving therein the legs and the head, the hollow body having a pair of diametrically opposite cord insertion holes communicating with the axial hole, and at least two locking teeth disposed below the cord insertion holes and projecting into the axial hole, the locking teeth being lockingly engageable with the feet, respectively, to couple the male and female members together when the male member is inserted into the female member, the hollow body further having a downwardly tapered inner surface extending downwardly of the locking teeth for engaging said feet of said legs to urge said male member upwardly.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
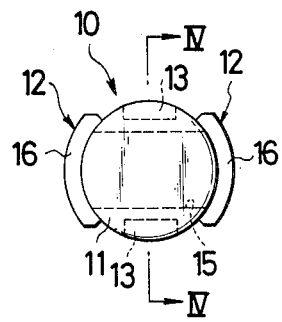
FIG. 1 is a plan view of a male member of a cord fastener according to a first embodiment of the present invention.

Identical parts are denoted by identical reference characters throughout several views.

FIGS. 1 through 11 illustrate a cord fastener according to a first embodiment, the cord fastener being composed of a male member 10 and a female member 20, both molded of synthetic resin.

As shown in FIGS. 1 through 4, the male member 10 generally comprises a cylindrical head 11 and a plurality (two in the illustrated embodiment) of parallel spaced resilient legs 12, 12 extending integrally and downwardly from a lower surface of the head 11. The legs 12, 12 are disposed in diametrically opposite relation to one another.

Figure 3:
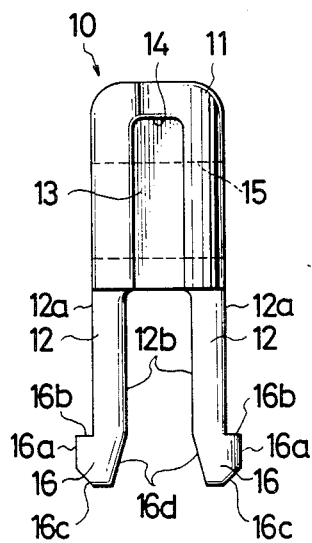
FIG. 3 is a front elevational view of the male member.
Figure 4:
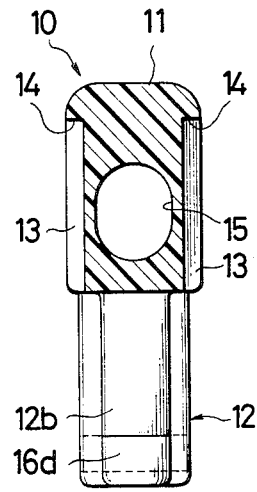
FIG. 4 is a cross-sectional view taken along line IV—IV of FIG. 1.
Figure 5:
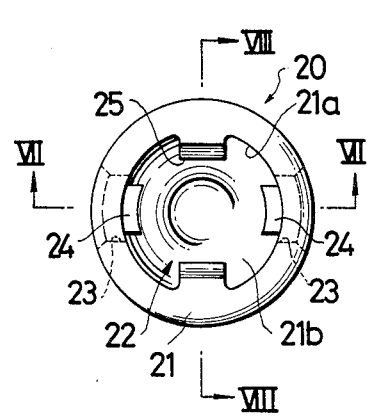
FIG. 5 is a plan view of a female member of the cord fastener of the first embodiment.
Figure 6:
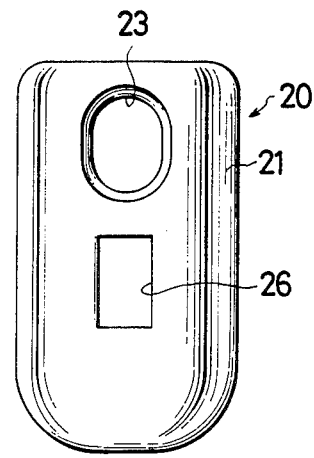
FIG. 6 is an elevational view of the right side of FIG. 5.

The cylindrical head 11 includes a pair of diametrically opposite axial guide grooves 13, 13 extending from the lower surface toward an upper surface of the head 11 and terminating short of the upper surface, respectively, at a pair of downwardly facing stop surfaces 14, 14 (FIGS. 3 and 4). The head 11 further has a transverse through-hole 15 extending diametrically through the head 11 for receiving a cord. The through-hole 15 is disposed closer to the lower surface of the head 11 than to the upper surface and extends perpendicular to an axial plane extending parallel to the guide grooves 14. As shown in FIG. 4, the through-hole 15 has an oblong shape whose major or longer axis extends parallel to the axis of the head 11.

Figure 2:
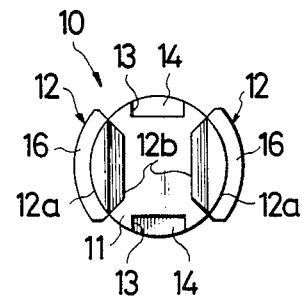
FIG. 2 is a bottom view of the male member shown in FIG. 1.

The legs 12 are disposed below opposite ends of the through-hole 15 in staggered relation to the guide grooves 13, 13, and they are resiliently deformable inwardly toward each other. The legs 12 have a generally segmental shape in transverse cross section and, as shown in FIGS. 2 and 3, each leg 12 includes an arcuate outer surface 12a lying flush with a peripheral surface of the head 11, and a flat inner surface 12b extending parallel to the flat inner surface 12b of the opposite leg 12. The leg 12 has an enlarged foot 16 projecting radially outwardly from a lower end of the leg 12. As shown in FIG. 3, the foot 16 includes an arcuate outer surface 16a extending parallel to the arcuate outer surface 12a of the leg 12, an upper locking surface 16b extending normal to the outer surface 16a, a bevelled lower surface 16c extending contiguously to and downwardly from the outer surface 16a, and a slanted inner surface 16d inclined progressively outwardly in the downward direction. With the slanted inner surfaces 16d, the legs 12 are prevented from interferring with each other when they are forced to flex resiliently inwardly toward each other.

As illustrated in FIGS. 5 through 8, the female member 20 is essentially composed of a hollow tubular body 21 having an axial blind hole 22 opening upwardly for insertion therein of the legs 12 and the head 11 of the male member 10. The tubular body 21 has a diametrically opposite cord insertion holes 23, 23 communicating at their inner ends with the axial blind hole 22, and a pair of locking teeth 24, 24 disposed immediately below the respective cord insertion holes 23, 23 and projecting into the blind hole 22, the locking teeth 24 being respectively engageable with the feet 16 of the male member 10 for retaining the male and female member 10, 20 in assembled condition as described later.

The axial blind hole 22 is defined jointly by an upper inner peripheral surface 21a of a uniform diameter which is slightly larger than the diameter of a common circle of the arcuate outer surfaces 16a of the male member 10, a downwardly tapered inner surface 21b extending downwardly from the upper peripheral surface 21a to the bottom of the hollow body 21, and a pair of diametrically opposite elongate ridges 25, 25 slidably receivable in the corresponding guide grooves 13, 13 of the male member 10. With this construction, the male member 10 is receivable in the axial blind hole 22 of the female member 20 and, after insertion thereof, it is prevented from rotating with respect to the female member 20. The blind hole 22 has a length or depth selected such that the head 11 slightly projects from the upper surface of the hollow body 21 when the male member 10 is fully inserted into the female member 20 until the stop surfaces 14 of the head 11 abut against upper ends of the respective guide ridges 25. The upper inner peripheral surface 21a has a length substantially equal to the length of the cylindrical head 11, and the tapered surface 21b has a length smaller than the length of the legs 12. The guide ridges 25 project into the axial blind hole 22 in staggered relation to the locking teeth 24 and extend downwardly from the upper surface of the hollow body 21 toward the bottom of the hollow body 21, the ridges 25 terminating short of the bottom of the hollow body 21. Thus, the guide ridges 25 extend across the upper inner peripheral surface 21a and blend into the tapered inner surface 21b, as shown in FIGS. 7 and 8.

The cord insertion holes 23, 23 an oblong shape substantially the same as the shape of the through-hole 15 of the male member 10 and they are located such that the through-hole 15 and the cord insertion holes 23, 23 are brought into alignment with one another when the male member 10 is inserted into the female member 20 until the stop surfaces 14 of the head 11 engage the upper ends of the guide ridges 25, 25.

Figure 7:
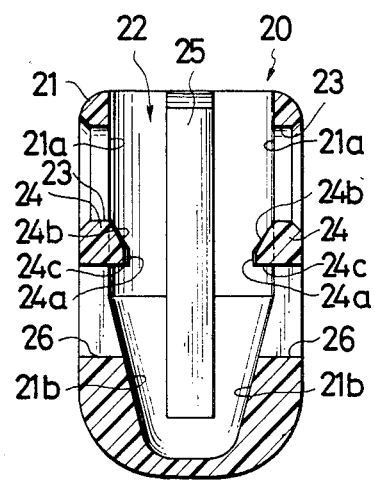
FIG. 7 is a cross-sectional view taken along line VII—VII of FIG. 5.
Figure 8:
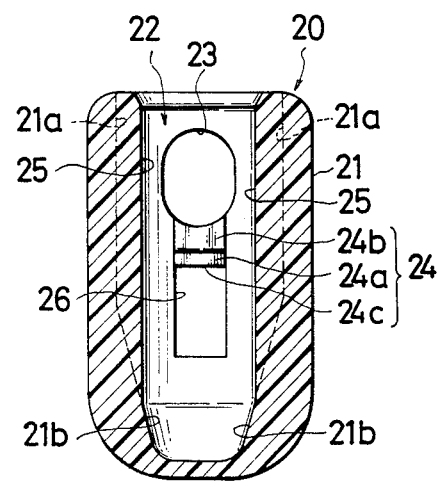
FIG. 8 is a cross-sectional view taken along line VIII—VIII of FIG. 5.

As shown in FIG. 7, each of the locking teeth 24 includes an arcuate inner surface 24a having a radius of curvature which is substantially the same as or slightly greater than that of the peripheral surface of the head 11 of the male member 10. The locking tooth 24 further has a bevelled upper surface 24b extending upwardly outwardly from the inner surface 24a and inclined radially outwardly in the upward direction, and a lower retaining surface 24c extending normal to the inner surface 24a. The hollow tubular body 21 of the female member 20 further includes a pair of diametrically opposite slots 26, 26 disposed immediately below the respective locking teeth 24 and communicating with the axial blind hole 22. The slots 26 have a width which is substantily the same as the width of the locking teeth 24 and which is smaller than the width of the feet 16 of the legs 12 so that the feet 16 are slidably movable along the tapered inner surface 21b of the hollow body 21 without being trapped in the slots 26 when the male member 10 is forced into the socket member 20. The slots 26 are utilized as finger-or tool-insertion apertures through which the user's fingers or tips of a suitable tool are interted to force the legs 12 inwardly toward each other until the feet 16 are released from interlocking engagement with the locking teeth 24 when the male member 10 is to be disassembled from the female member 20 for some reasons.

Figure 9:
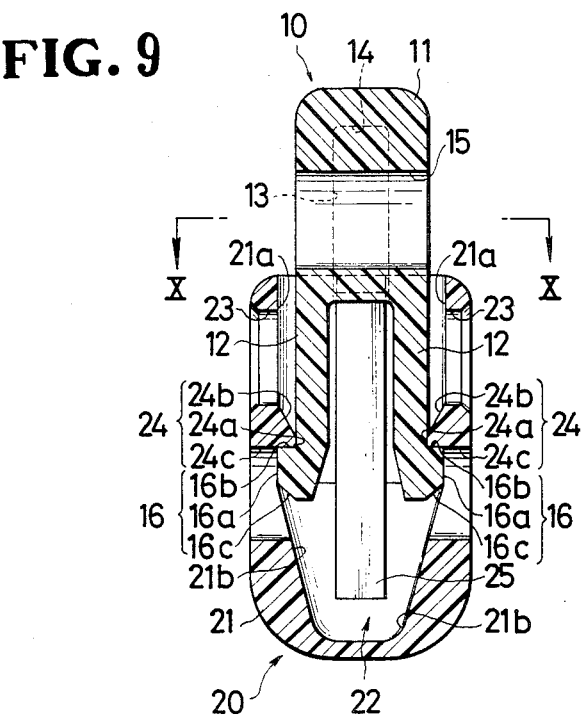
FIG. 9 is a cross-sectional view of the cord fastener of the first embodiment, with the male and female members coupled together.

To assemble the male and female members 10, 20 into a cord fastener, the resilient legs 12 of the male member 10 are inserted downwardly into the axial blind hole 22 in the female member 20 while the guide grooves 13 are held in alignment with the guide ridges 25. In the course of inserting the male member 10 into the female member 20, the lower bevelled surfaces 16c of the feet 16 are brought into contact with the upper bevelled surfaces 24b of the locking teeth 24. As the male member 10 is forced into the female member 20, the legs 12 are caused to be elastically deformed inwardly about their upper ends, and the annular outer surfaces 16a of the feet 16 are brought into sliding engagement with the arcuate inner surfaces 24c of the locking teeth 24. A further downward movement of the male member 10 causes the outer surfaces 16a of the feet 17 to move downwardly past the inner surfaces 24a of the locking teeth 24, whereupon the legs 12 are allowed to spring back radially outwardly. Now, the male and female members 10, 20 are coupled together as shown in FIG. 9. The male member 10 cannot easily be released from the female member 20 since the upper locking surfaces 16b of the feet 16 engage the lower retaining surfaces 24c of the locking teeth 24. In this coupled condition, the guide ridges 25 of the female member 20 are fitted in the guide grooves 13 in the male member 10, thereby preventing the male member 10 from rotating about its own axis within the female member 20.

Figure 11:
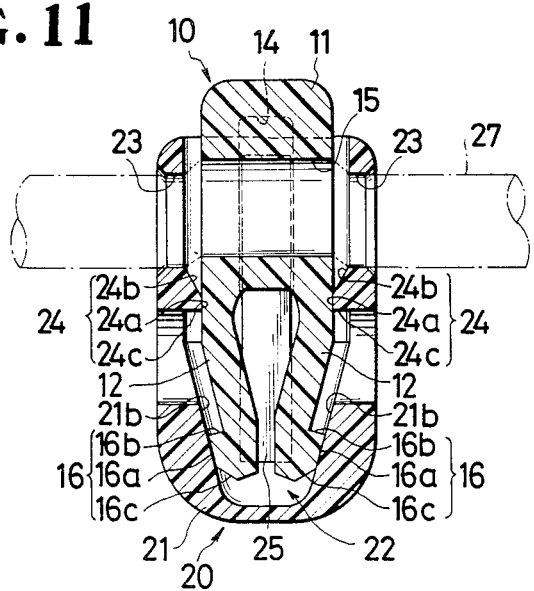
FIG. 11, appearing with FIG. 9, is a view similar to FIG. 10 but showing the cord fastener in operated position.
Figure 10:
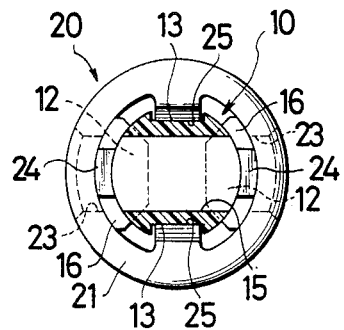
FIG. 10 is a cross-sectional view taken along line X—X of FIG. 9.

In use, the cord fastener is gripped endwise by the user's fingers and then the male member 10 is displaced downwardly against the resiliency of the legs 16 until the upper ends of the guide ridges 25 of the hollow tubular body 21 abut against the stop surfaces 14 of the head 11. At this time, the through-hole 15 in the head 11 and the cord insertion holes 23 in the tubular body 21 extend in coaxial alignment with each other. Then a cord or string 27 shown in FIG. 11 is threaded through one of the cord insertion hole 23, the through-hole 15 and the other cord insertion hole 23. When released from the downward pressure, the male member 10 is moved upwardly as the feet 16 of the legs 12 are urged by the resilient forces stored in the inwardly flexed legs 12 to slide upwardly along the tapered inner surface 21a of the tubular body 21. The cord 27 is therefore gripped firmly by and between the male and female members 10, 20 against accidental displacement, as shown in FIG. 11.

If it is desired to adjust the degree to or the position in which the cord 27 is fastened while the cord fastener is in use as shown in FIG. 11, then the male member 10 should be displaced downwardly against the resiliency of the legs 16 until the through-hole 15 and the cord insertion holes 23 are brought into coaxial alignment with one another. The cord 27 can now be adjusted to change its position with respect to the cord fastener or vary the degree to which the cord 27 is fastened by the cord fastener. In case the cord 27 is removed from the cord fastener, the male member 10 is moved upwardly under the resilient forces stored in the legs 12 until the feet 17 engage the locking teeth 24. With this engagement, the male and female members 10, 20 are kept in the coupled condition shown in FIG. 9.

Figure 12:
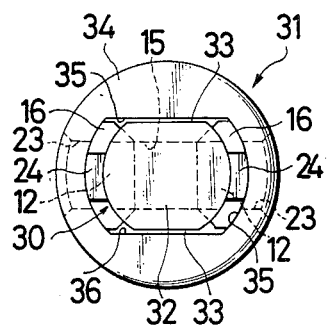
FIG. 12, appearing with FIG. 10, is a plan view of a cord fastener according to a second embodiment, with male and female members coupled together.

FIG. 12 illustrates a cord fastener according to a second embodiment of the present invention. The cord fastener includes a male member 30 non-rotatably received in a female member 31. The male member 30 includes a partially flattened cylindrical head 32 having a pair of diametrically opposite flat surfaces 33, 33 extending axially therealong. The female member 31 is composed of a hollow tubular body 34 having an axial blind hole 35 of a generally oblong shape. The tubular body 34 has a pair of opposed flat lands 36, 36 extending axially on an inner surface thereof. When the male and female members 30, 31 are coupled as shown in FIG. 2, the flat surfaces 33 and the flat bands 36 confront each other, leaving a clearance therebetween with the result that the male member 30 is held non-rotatable with respect to the female member 31. The other structural details of the male and female members 30, 31 are the same as those of the male and female members 20, 20 of the first embodiment.

As described above, the cord fastener of the present invention is composed of only two cooperative component parts, i.e. the male and female members and hence can be manufactured at less cost. The male and female members can easily be coupled together through snapping engagement of the resilient legs of the male member with the locking teeth of the female member, and once coupled, they are firmly retained together against displacement from each other. Due to the resiliency of the legs, the male member is normally urged in a direction to grip the cord between the male and female members, therefore, by merely displacing the male member in the opposite direction, the cord can easily be adjusted to change its position with respect to the cord fastener or to vary the degree to which the cord is fastened by the cord fastener.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A cord fastener comprising:
   (a) a male member composed of a head having a transverse through-hole for receiving therein a cord, and at least two resilient legs extending integrally and downwardly from said head and having feet projecting laterally outwardly from lower ends of the respective legs; and
   (b) a female member composed of a hollow body having an axial hole for receiving therein said legs and said head, said hollow body having a pair of diametrically opposite cord insertion holes communicating with said axial hole, and at least two locking teeth disposed below said cord insertion holes and projecting into said axial hole, said locking teeth being lockingly engageable with said feet, respectively, to couple said male and female member, said hollow body further having a downwardly tapered inner surface extending downwardly of said locking teeth for engaging said feet of said legs to urge said male member upwardly, said head further having a cylindrical shape and having at least one guide groove extending axially in a peripheral surface of said cylindrical head, said hollow body having a tubular shape and having at least one guide ridge extending axially on an inner peripheral surface of said tubular body, said guide ridge being slidably receivable in said guide groove.

2. A cord fastener according to claim 1, said guide groove extending from a lower surface of said cylindrical head toward an upper surface of the same and terminating at a downwardly facing stop surface of said head located near an upper surface of said head, said guide ridge extending from an upper end of said tubular body toward a lower end of the same, said through-hole in said head and said cord insertion holes in said tubular body extending in coaxial alignment with each other when said stop surface engages an upper end of said guide ridge.

3. A cord fastener according to claim 2, said guide groove being disposed in staggered relation to said legs, said guide ridge being disposed in staggered relation to said locking teeth.

4. A cord fastener according to claim 2, said guide groove extending in a plane perpendicular to the axis of said through-hole.

5. A cord fastener comprising:
   (a) a male member composed of a head having a transverse through-hole for receiving therein a cord, and at least two resilient legs extending integrally and downwardly from said head and having feet projecting laterally outwardly from lower ends of the respective legs; and
   (b) a female member composed of a hollow body having an axial hole for receiving therein said legs and said said head, said hollow body having a pair of diametrically opposite cord insertion holes communicating with said axial hole, and at least two locking teeth disposed below said cord insertion holes and projecting into said axial hole, said locking teeth being lockingly engageable with said feet, respectively, to couple said male and female members together when said male member is inserted into said female member, said hollow body further having a downwardly tapered inner peripheral surface extending downwardly of said locking teeth and engageable with said feet to resiliently flex said legs inwardly toward each other, thereby enabling said feet to slide upwardly toward said locking teeth along said tapered inner peripheral surface under the resilient forces stored in the inwardly flexed legs.

6. A cord fastener according to claim 5, said head having a partially flattened cylindrical shape and having at least one flat surface extending axially along said partially flattened cylindrical head, said hollow body having a generally tubular shape including at least one flat land extending axially on a inner surface of said tubular body, said flat surface of said head confronting said flat land of said tubular body with a clearance defined therebetween.

7. A cord fastener according to claim 5, each said foot including an upper locking surface and a bevelled lower surface, each said locking tooth including a lower retaining surface lockingly engageable with said upper surface of said foot and a bevelled upper surface frictionally engageable with said lower bevelled surface of said foot.

8. A cord fastener according to claim 7, said foot further including an outer surface extending between said upper locking surface and said bevelled lower surface, said tooth further including an inner surface extending between said upper bevelled surface and frictionally engageable with said outer surface of said foot.

9. A cord fastener according to claim 5, said head having a cylindrical shape, said feet having a pair of arcuate outer surfaces, respectively, said hollow body including an upper inner peripheral surface having a diameter slightly larger than the diameter of a common circle of said feet, said locking teeth having a pair of arcuate inner surfaces, respectively, extending in a common circle having a diameter slightly larger than the outside diameter of said cylindrical head.

10. A cord fastener according to claim 5, said hollow body having a pair of slots disposed immediately below said locking teeth, respectively, and communicating with said axial hole, said slots having a width smaller than the width of said feet.

* * * * *